US006546215B2

United States Patent
Machida

(10) Patent No.: US 6,546,215 B2
(45) Date of Patent: Apr. 8, 2003

(54) IMAGE FORMING APPARATUS AND METHOD HAVING DOCUMENT ORIENTATION CONTROL

(75) Inventor: Hironobu Machida, Tokyo (JP)

(73) Assignee: Toshiba Tec Kabushiki Kaisha, Tokyo (JP)

(*) Notice: Subject to any disclaimer, the term of this patent is extended or adjusted under 35 U.S.C. 154(b) by 0 days.

(21) Appl. No.: 09/948,666

(22) Filed: Sep. 10, 2001

(65) Prior Publication Data

US 2003/0049062 A1 Mar. 13, 2003

(51) Int. Cl.$^7$ ............................................. G03G 15/00
(52) U.S. Cl. ..................... 399/82; 358/1.18; 358/450; 358/300
(58) Field of Search ................. 358/296, 300, 358/302, 540, 450, 462, 451, 1.18; 382/296, 297, 298; 399/82, 85, 194

(56) References Cited

U.S. PATENT DOCUMENTS

| | | | | |
|---|---|---|---|---|
| 5,051,843 A | * | 9/1991 | Hayashi | 358/450 |
| 5,450,213 A | * | 9/1995 | Kobori et al. | 358/450 |
| 5,475,475 A | * | 12/1995 | Kohtani et al. | 399/79 |
| 5,625,466 A | * | 4/1997 | Nakajima | 358/449 |
| 5,867,279 A | * | 2/1999 | Funamizu et al. | 358/296 |
| 5,930,001 A | * | 7/1999 | Satoh et al. | 358/296 |
| 6,144,777 A | * | 11/2000 | Tada et al. | 382/284 |
| 6,304,681 B1 | * | 10/2001 | Akiba et al. | 382/297 |
| 6,473,196 B2 | * | 10/2002 | Usami et al. | 358/1.18 |

FOREIGN PATENT DOCUMENTS

JP        6-103411       4/1994

* cited by examiner

*Primary Examiner*—Robert Beatty
(74) *Attorney, Agent, or Firm*—Foley & Lardner

(57) ABSTRACT

In an image forming apparatus and method of the present invention, a control section determines whether or not a document is copied first, and determines, on the basis of the determination result, whether or not the orientation of the document should be detected. If it is determined that the orientation of the document should be detected, a document orientation detecting section extracts character data from image data, recognizes the character data, and detects the orientation of the document on the basis of the recognition result. On the basis of the detection result, a page memory control section executes a rotation process on the image data. The image data subjected to the rotation process is read and printed onto an image forming medium.

16 Claims, 8 Drawing Sheets

| Main scanning | Lengthwise | | | | | | | | | | | | | | | |
|---|---|---|---|---|---|---|---|---|---|---|---|---|---|---|---|---|
| Character orientation of top page | Upward | | | | Downward | | | | Rightward | | | | Leftward | | | |
| Top page horizontal/vertical writing | Horizontal writing | | Vertical writing | | Horizontal writing | | Vertical writing | | Horizontal writing | | Vertical writing | | Horizontal writing | | Vertical writing | |
| Character orientation of reverse page | Up-ward | Down-ward | Up-ward | Down-ward | Up-ward | Down-ward | Up-ward | Down-ward | Right-ward | Left-ward | Right-ward | Left-ward | Right-ward | Left-ward | Right-ward | Left-ward |
| Top page rotation process | 0 | 0 | 0 | 0 | 180 | 0 | 180 | 0 | 0 | 0 | 0 | 180 | 180 | 0 | 180 | 180 |
| Reverse page rotation process | 0 | 180 | 0 | 180 | 0 | 180 | 0 | 180 | 0 | 180 | 180 | 0 | 0 | 180 | 0 | 180 |
| Determination of binding side | Left side binding | Top side binding | Right side binding | Top side binding | Top side binding | Left side binding | Top side binding | Right side binding | Left side binding | Top side binding | Right side binding | Top side binding | Top side binding | Left side binding | Top side binding | Right side binding |
| 2-in-1 arrangement on top page | Upper portion | | | | | | | | Upper portion | | Lower portion | | | Upper portion | Lower portion | |
| 2-in-1 arrangement on reverse page | Lower portion | | | | | | | | Lower portion | | Upper portion | | | Lower portion | Upper portion | |

FIG.7

| Main scanning | Shortwise | | | | | | | | | | | | | | | |
|---|---|---|---|---|---|---|---|---|---|---|---|---|---|---|---|---|
| Character orientation of top page | Upward | | | | Downward | | | | Rightward | | | | Leftward | | | |
| Top page horizontal/vertical writing | Horizontal writing | | Vertical writing | | Horizontal writing | | Vertical writing | | Horizontal writing | | Vertical writing | | Horizontal writing | | Vertical writing | |
| Character orientation of reverse page | Up-ward | Down-ward | Up-ward | Down-ward | Up-ward | Down-ward | Up-ward | Down-ward | Right-ward | Left-ward | Right-ward | Left-ward | Right-ward | Left-ward | Right-ward | Left-ward |
| Top page rotation process | 0 | 0 | 0 | 0 | 180 | 0 | 180 | 0 | 0 | 180 | 0 | 180 | 180 | 0 | 180 | 0 |
| Reverse page rotation process | 0 | 180 | 0 | 180 | 0 | 180 | 0 | 180 | 180 | 0 | 180 | 0 | 0 | 180 | 0 | 180 |
| Determination of binding side | Left side binding | Top side binding | Right side binding | Top side binding | Top side binding | Left side binding | Top side binding | Right side binding | Left side binding | Top side binding | Right side binding | Top side binding | Top side binding | Left side binding | Top side binding | Right side binding |
| 2-in-1 arrangement on top page | Left portion | | Right portion | | Left portion | | Right portion | | Right portion | | | | | | Top portion | |
| 2-in-1 arrangement on reverse page | Right portion | | Left portion | | Right portion | | Left portion | | Left portion | | | | | | | |

FIG. 8

IMAGE FORMING APPARATUS AND METHOD HAVING DOCUMENT ORIENTATION CONTROL

BACKGROUND OF THE INVENTION

The present invention relates to an image forming apparatus and method for outputting to-be-copied images, which are employed in, for example, an office automation apparatus such as a copy machine, and can copy a plurality of documents onto one side or both sides of a paper sheet.

In conventional image forming apparatuses, document orientation detection is executed for each document.

Specifically, the length/width of each document is no detected, and the detection result is used for automatic selection of paper sheets. However, so-called 2-in-1 printing in which both side data is copied onto one side, it is possible that the top and bottom of a document will be opposite, depending upon the orientation of the document set on a document table.

For example, think about a double-sided document of A4 size, portrait-oriented, with horizontal writing, which is supposed to be bound lengthwise. In this case, if the document is placed in the A4 direction, the top/reverse sides of the document are arranged in left and right portions of a paper sheet, with the tops and bottoms of the top/reverse sides kept in the same direction. However, if the document is placed in the A4-R direction, the tops and bottom of the top/reverse sides of the document arranged in left and right portions of a paper sheet are opposite.

Further, think about a double-sided document of A4 size, landscape-oriented, with horizontal writing, which is supposed to be bound widthwise. In this case, if, the document is placed in the A4-R direction, the tops and bottoms of the top/reverse sides of the document arranged in left and right portions of a paper sheet are in the same direction. However, if the document is placed in the A4 direction, the tops and bottoms of the top/reverse sides of the document arranged in left and right portions of a paper sheet are opposite.

Furthermore, to which side of a paper sheet each of the top and reverse sides of a document corresponds depends upon whether the document contains vertical writing or horizontal writing. It is troublesome for the user to execute such settings. In light of this, techniques of extracting and recognizing a character written in a document, thereby determining the top and bottom of the document and automatically aligning them have been proposed. Thus, various methods for determining the top and bottom of a document using a character recognition function are known. In these methods, however, character recognition is executed each time a document is input.

Character recognition requires a lot of time. Therefore, if character recognition is executed on each document, the copying performance is inevitably significantly degraded.

In addition, Japanese Patent Application KOKAI Publication No. 6-103411 proposes a technique of detecting the angle of rotation if a document is input at an angle with respect to a predetermined direction set in a scanner, thereby modifying an input image into a correct direction and then reading it. However, also in this technique, character recognition is executed each time a document is input.

BRIEF SUMMARY OF THE INVENTION

The present invention has been developed in light of the aforementioned problem, and aims to prevent degradation of copying performance by a technique of executing character recognition on only the first one of documents used by the user on the assumption that it is very possible that the tops and bottoms of the documents are aligned, thereby determining, on the basis of the character recognition result concerning the first document, a rotation/arrangement method for inputting the documents, and processing the second et seq. documents, without character recognition but using the method determined when processing the first document.

To satisfy the aim, according to a first aspect of the invention, there is provided an image forming apparatus for reading images of documents that are defined by a main scanning direction and a sub-scanning direction, and copying the images onto an image forming medium, comprising: conveyance means for conveying a document; reading means for reading an image of the document to obtain image data; determining means for determining whether or not the conveyed document should be copied first, and also determining, on the basis of the determination result, whether or not an orientation of the document should be detected; document orientation detecting means for extracting character data from the image data, recognizing the character data, and detecting the orientation of the document on the basis of the recognition result, if the determining means determines that the orientation of the document should be detected; image data rotation process means for executing a rotation process on the image data obtained by the reading means, on the basis of the detection result of the document orientation detecting means; and image forming means for reading the image data subjected to the rotation process by the image data rotation process means, thereby forming an image onto the image forming medium.

According to a second aspect of the invention, there is provided an image forming apparatus for reading images of documents that are defined by a main scanning direction and a sub-scanning direction, and copying the images onto image forming medium, comprising: a conveyance section configured to convey a document; a scanner section configured to read an image of the document and obtain image data; a control section configured to determine whether or not the conveyed document should be copied onto a first page of the image forming medium, and to determine that an orientation of the document should be detected by a document orientation detecting section, only if the document is determined to be copied onto the first page of the image forming medium; a document orientation detecting section configured to extract character data from the image data, recognize the character data, and detect the orientation of the document on the basis of the recognition result, if the determining section determines that the orientation of the document should be detected; a page memory control section configured to execute a rotation process on the image data obtained by the scanner section, on the basis of the detection result of the document orientation detecting section; and a printer section configured to read the image data subjected to the rotation process, thereby forming an image onto the image forming medium.

According to a third aspect of the invention, there is provided an image forming method of reading images of documents that are defined by a main scanning direction and a sub-scanning direction, and copying the images onto an image forming medium, comprising: a first step of conveying a document; a second step of reading an image of the document to obtain image data; a third step of determining whether or not the conveyed document should be copied first, and also determining, on the basis of the determination result, whether or not an orientation of the document should be detected; a fourth step of extracting character data from the image data, recognizing the character data, and detecting the orientation of the document on the basis of the recognition result, if it is determined that the orientation of the document should be detected; a fifth step of executing a rotation process on the image data obtained by the reading means, on the basis of the detection result; and a sixth step of reading the image data subjected to the rotation process, thereby forming an image onto the image forming medium.

According to a fourth aspect of the invention, there is provided an image forming method of reading images of documents that are defined by a main scanning direction and a sub-scanning direction, and copying the images onto image forming medium, comprising: a first step of conveying a document using a conveyance section; a second step of reading an image of the document and obtaining image data, using a scanner section; a third step of determining, using a control section, whether or not the conveyed document should be copied onto a first page of the image forming medium, and determining that an orientation of the document should be detected by a document orientation detecting section, only if the document is determined to be copied onto the first page of the image forming medium; a fourth step of extracting character data from the image data, recognizing the character data, and detecting the orientation of the document on the basis of the recognition result, using the document orientation detecting section, if the determining section determines that the orientation of the document should be detected; a fifth step of executing, using a page memory control section, a rotation process on the image data obtained by the scanner section, on the basis of the detection result of the document orientation detecting section; and a sixth step of reading the image data subjected to the rotation process, and forming an image onto the image forming medium, using a printer section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 7 is a view useful in explaining, in detail, a method of determining the position of an N-in-1 document in a case where the main scanning direction of the document is the longitudinal direction thereof;

FIG. 8 is a view useful in explaining, in detail, a method of determining the position of an N-in-1 document in a case where the main scanning direction of the document is the width direction thereof;

DETAILED DESCRIPTION OF THE INVENTION

An embodiment of the invention will be described with reference to the accompanying drawings.

Figure 1:
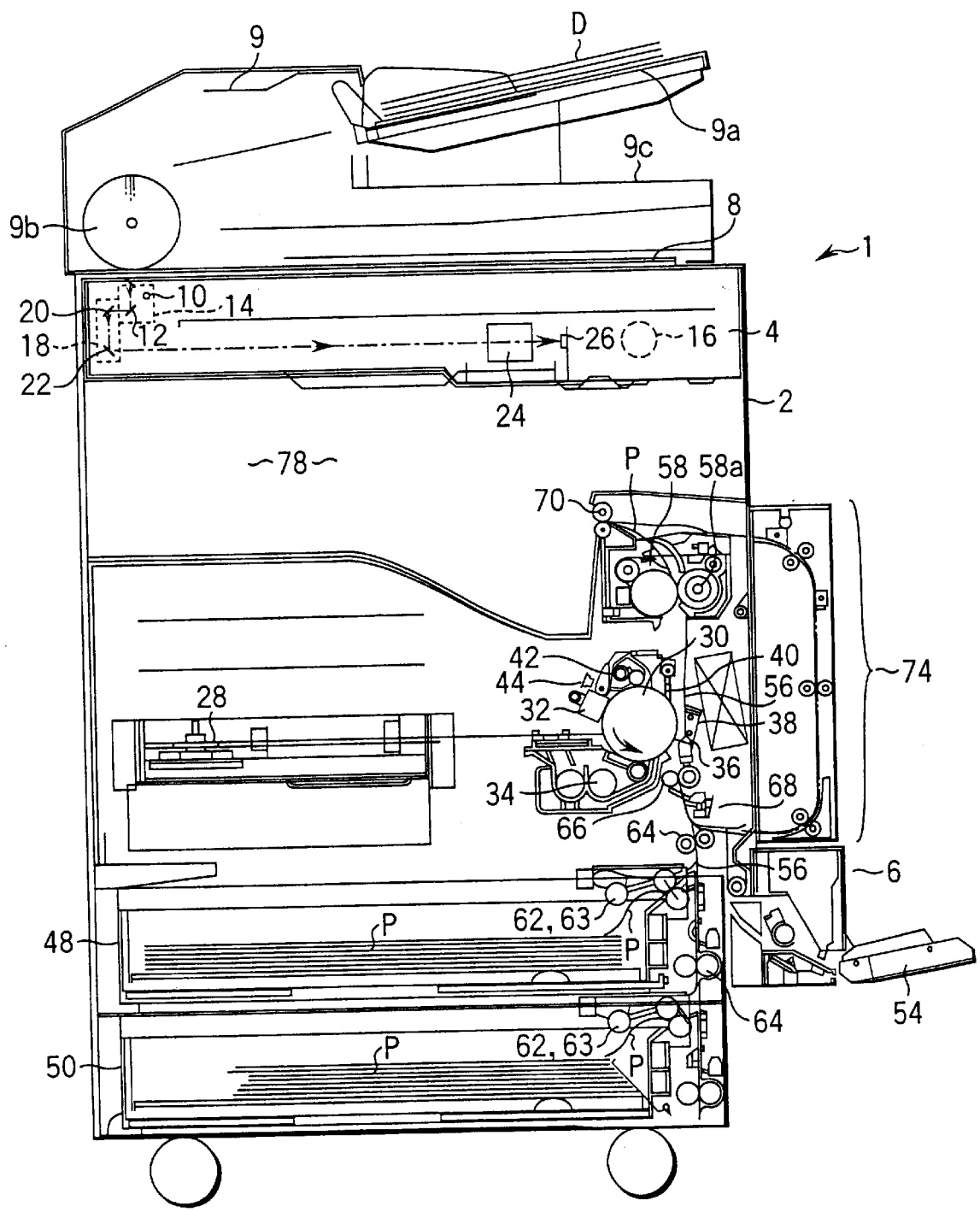
FIG. 1 is a schematic view illustrating a digital copy machine 1 as an example of an image forming apparatus according to an embodiment of the invention.

FIG. 1 is a schematic view illustrating a digital copy machine 1 as an example of an image forming apparatus according to an embodiment of the invention.

As shown in FIG. 1, an apparatus main body 2 incorporated in the digital copy machine 1 contains a scanner section 4 and a printer section 6. Further, a document table 8 for mounting thereon a document D as a to-be-read object is provided on the upper surface of the apparatus main body 2.

The document table 8 is formed of a transparent glass.

An automatic document feeder 9 (hereinafter referred to simply as an "ADF") is also provided on the upper surface of the apparatus main body 2 for automatically feeding a document D onto the document table 8.

A document D placed on a document tray 9a, which is incorporated in the ADF 9, is conveyed by a conveyance guide (not shown) and discharged onto a discharge tray 9c by a platen roller 9b. While the document D is being conveyed by the platen roller 9b, it is exposed/scanned by an exposure lamp 10 incorporated in the scanner section 4, described later. As a result, the document D is read.

Documents D are set on the document tray 9a of the ADF 9 with their to-be-read surfaces directed upward, and fed one by one, beginning from the uppermost one.

The scanner section 4 contained in the apparatus main body 2 includes the exposure lamp 10 and a first mirror 12. The exposure lamp 10 is a light source for illuminating a document D to be conveyed by the ADF 9 or placed on the document table 8, and is, for example, a halogen lamp. The first mirror 12 deflects, in a predetermined direction, light reflected from a document D. The exposure lamp 10 and the first mirror 12 are attached to a first carriage 14 provided below the document table 8.

The first carriage 14 is configured to be movable in parallel with the document table 8. The first carriage is reciprocated by a scanner motor (driving motor) 16 below the document table 8. The scanner motor 16 is, for example, a stepping motor.

A second carriage 18 is also provided below the document table 8 such that it is movable in parallel with the table 8. The second carriage 18 includes second and third mirrors 20 and 22 attached to each other at right angles and configured to sequentially deflect the light, which is reflected from the document D and deflected by the first mirror 12.

A rotational force is transmitted from the scanner motor 16 to the second carriage 18 via, for example, a toothed belt for driving the first carriage 14, whereby the second carriage 18 is driven with respect to the first carriage 14 and moved along and parallel to the document table 8 at half the speed of the first carriage 14.

An imaging lens 24 and a CCD sensor 26 are also provided below the document table 8. The imaging lens 24 converges the light reflected from the third mirror 20 of the second carriage 18. The CCD sensor 26 receives the reflected light converged by the imaging lens 24 and subjects it to photoelectric conversion. The imaging lens 24 is located in a plane that includes the optical axis of the light deflected by the third mirror 22, such that it can be moved by a driving mechanism. This lens converges the reflected light with a desired magnification (in the main scanning direction) when it has been moved appropriately.

The CCD sensor 26 subjects incident light to photoelectric conversion in accordance with an image processing clock supplied from a main CPU described later, and outputs an electric signal corresponding to the read document D. The magnification in the sub-scanning direction can be adjusted by changing the feeding speed of the ADF 9 or the movement speed of the first carriage 14.

When reading a document D fed by the ADF 9, the light emission position of the exposure lamp 10 is fixed at the position shown in FIG. 1. Further, when reading a document D placed on the document table 8, the light emission position of the exposure lamp 10 is moved from left to right along the document table 8.

The printer section 6 includes a laser exposure unit 28.

The laser exposure unit 28 is used to scan the surface of a photosensitive drum 30 by emitting a laser beam thereto, thereby forming an electrostatic latent image on the photosensitive drum 30.

The printer section 6 also includes the photosensitive drum 30 provided as a rotatable image carrier at the right side of a substantially central portion of the apparatus main body 2.

A charger 32, a developing unit 34 and a separation charger 36 are integrally formed around the photosensitive drum 30. The charger 32 charges the surface of the drum with a predetermined charge. The developing unit 34 supplies toner, as a developer, onto an electrostatic latent image formed on the photosensitive drum 30, thereby developing the latent image at a desired image density. The separation charger 36 separates, from the photosensitive drum 30, an image recording medium fed from each cassette 48 or 59 described later, i.e. a copy paper sheet P.

Further, a transfer charger 38, a separation claw 40, a cleaner unit 42 and a deelectrifier unit 44 are provided. The transfer charger 38 transfers a toner image on the photosensitive drum 30 onto a paper sheet P. The separation claw 40 separates a paper sheet P from the peripheral surface of the photosensitive drum 30. The cleaner unit 42 removes toner remaining on the photosensitive drum 30. The deelectrifier unit 44 deelectrifies the peripheral surface of the photosensitive drum 30.

An upper cassette 48 and a lower cassette 50 drawable from the apparatus main body are stacked in a lower portion of the apparatus main body 2.

The cassettes 48 and 50 are filled with copy paper sheets P of different sizes.

A manual feed tray 54 is provided by the side of the upper cassette 48.

In the apparatus main body 2, a conveyance path 56 extends from each cassette 48 or 50 through a transfer section that is located between the photosensitive drum 30 and the transfer charger 38. A fixing unit 58 with a fixing lamp 58a is provided at the end of the conveyance path 56. A discharge port 60 is formed at an upper portion of the fixing unit 58.

A feed roller 62 and a separation roller 63 are provided near each of the upper and lower cassettes 48 and 50 for picking up paper sheets P one by one from the cassettes 48 and 50. A number of pairs of feed rollers 64 are provided along the conveyance path 56 for conveying each paper sheet P, picked by the feed roller 62 and the separation roller 63, through the conveyance path 56. A pair of resist rollers 66 are provided along the conveyance path 56 upstream of the photosensitive drum 30. The resistor rollers 66 correct the inclination of each picked paper sheet P, aligns the front end of a toner image on the photosensitive drum 30 with the front end of each copy paper sheet P, and feeds each copy paper sheet P to the transfer section at the same speed as the movement speed of the peripheral surface of the photosensitive drum 30.

A sensor 68 for detecting, before alignment, the arrival of each copy paper sheet P is provided upstream of the resist rollers 66, i.e. at the feed roller 64 side.

Copy paper sheets P picked, one by one, by the feed roller 62 from each cassette 48 or 50 are fed to the resist rollers 66 by the feed rollers 64.

After each copy paper sheet P has its front end aligned by the resist rollers 66, it is fed to the transfer section. In the transfer section, a developer image, i.e. a toner image, formed on the photosensitive drum 30 is transferred onto each paper sheet P by the transfer charger 38.

Each copy paper sheet P, onto which the toner image has been transferred, is separated from the peripheral surface of the photosensitive drum 30 by the separation charger 36 and the separation claw 40, and conveyed to the fixing unit 58 via a conveyance belt, not shown, which is included in the conveyance path 56.

After the developer image is fused and fixed on each paper sheet P, each paper sheet P is discharged by a pair of discharge rollers 70 through the discharge port 60 into a discharge tray 72 incorporated in the apparatus main body 2.

An automatic double-sided copy unit 74 for reversing each copy paper sheet P having passed through the fixing unit 58, and re-feeding it to the conveyance path 56 is provided on the right-hand side of the conveyance path 56. An operation panel is provided on an upper portion of the front face of the apparatus main body 2, and is used to designate various conditions for copying, such as copy magnification, or to instruct the apparatus to start a copying operation.

Figure 2:
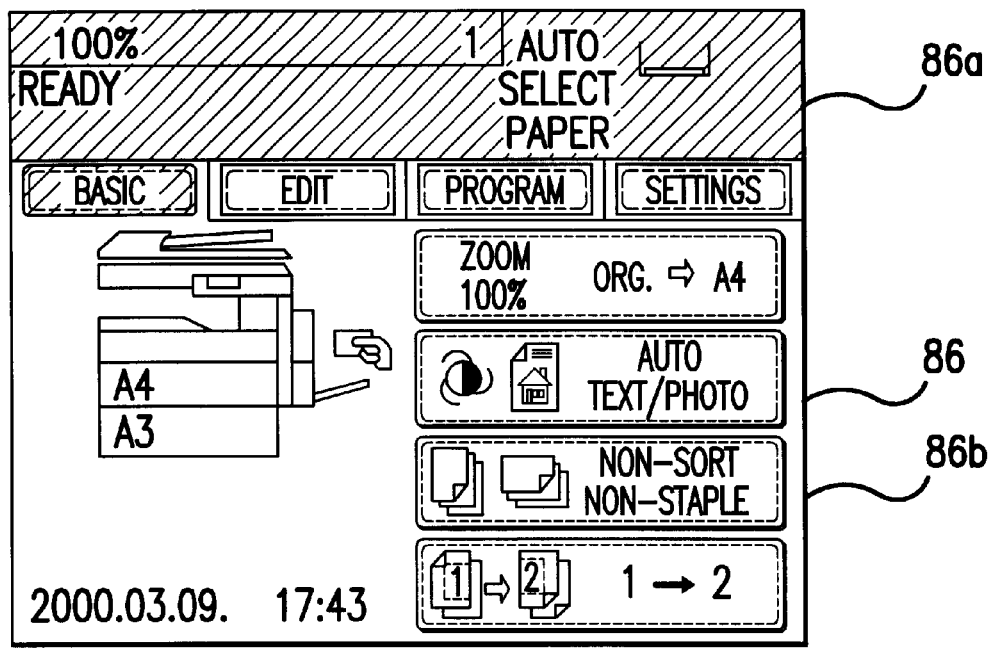
FIG. 2 is a view illustrating an example of a liquid crystal display section 86.

As shown in FIG. 2, the operation panel includes a liquid crystal display section 86 that contains touch keys used to execute operation guidance and also various instructions.

As shown in FIG. 2, the liquid crystal display section 86 comprises an operation guidance display section 86a for displaying operation guidance, such as "READY", and a setting display section 76b for executing selective display of various set contents. A setting display section 86b displays, as an initial screen, a setting screen for basic (BASIC) functions.

In this state, the selected state of an LCF 52 is displayed. Specifically, a zoom degree of 100%, a document size of A4, setting of a photo image and a text image, setting of non-sort mode and non-staple mode, and setting of double-sided copy mode are displayed. Icons for designating editing, programming, changing of settings, etc. are also displayed.

Further, the setting display section 86b includes setting windows for editing (EDIT), programming (PROGRAM) and settings (SETTINGS).

For example, in the windows for setting programming or settings, priority setting, job canceling, display of a job list, changing or adding of priority setting can be performed.

Figure 3:
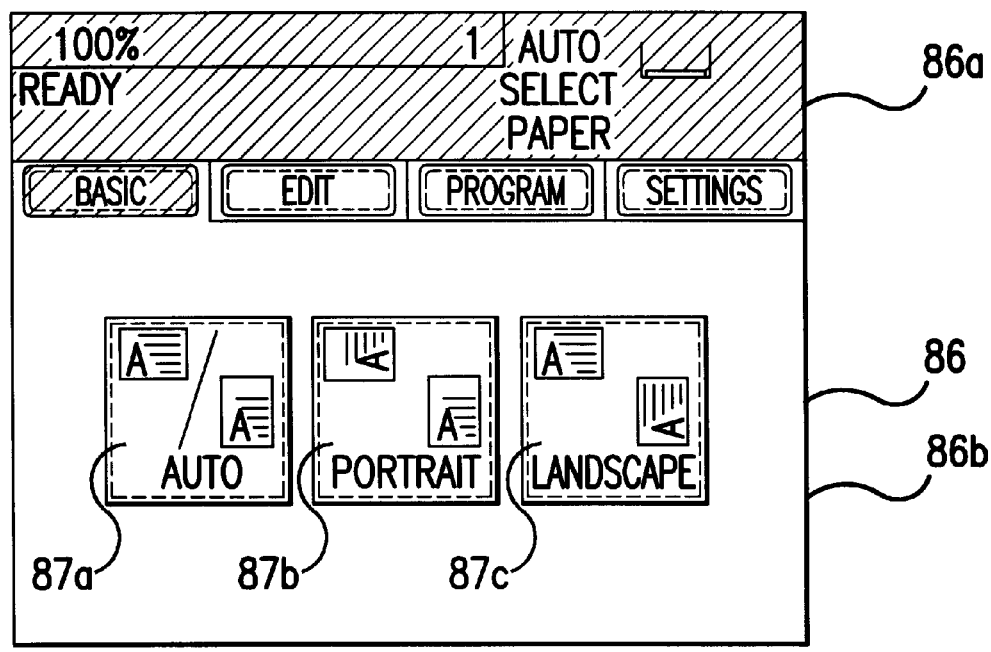
FIG. 3 is a view illustrating another example of the liquid crystal display section 86.

In the initial window shown in FIG. 2, if the double-sided copy mode icon is pushed, a setting window for setting the direction of an image is displayed as shown in FIG. 3.

This window displays an icon 87a for setting automatic copying of a document with horizontal writing and a document with vertical writing, an icon 87b for setting portrait-oriented copying of a document with horizontal writing and portrait-oriented copying of a document with vertical writing, and an icon 87c for setting landscape-oriented copying of a document with horizontal writing and landscape-oriented copying of a document with vertical writing.

The above-described digital copy machine 1 may be used independently or as a network printer. In the latter case, the digital copy machine 1 is connected to a personal computer (not shown) or a server (not shown) via a local network (LAN) (not shown).

Figure 4:
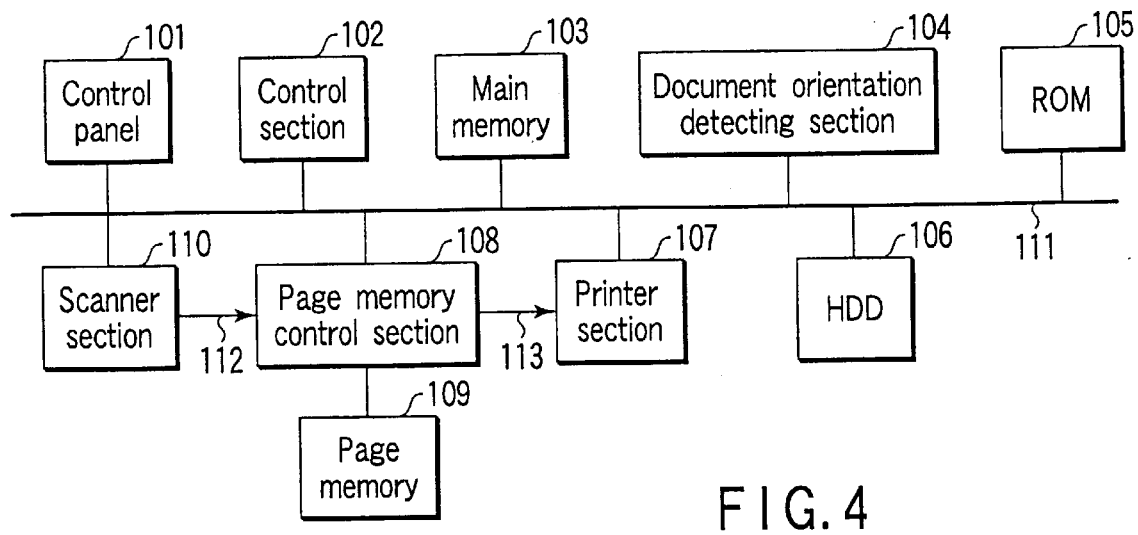
FIG. 4 is a block diagram illustrating the configuration of a control system incorporated in the image forming apparatus of the embodiment.

Referring now to FIG. 4, a detailed description will be given of a control system incorporated in the image forming apparatus of the embodiment.

As shown in FIG. 4, in the control system, a control panel 101, a control section 102, a main memory 103, a document orientation detecting section 104, a ROM 105, an HDD 106, a printer section 107, a page memory control section 108 and a scanner section 110 are communicably connected to each other via a system bus 111.

The scanner section 110 reads a document at a predetermined timing, converts the read image data into a digital signal, and outputs the digital signal to the page memory control section 108 via a scanner interface 112, together with a synchronous signal.

The page memory control section 108 receives the image data in synchronism with the synchronous signal from the scanner section 110, and temporarily stores it in a page memory 109.

The document orientation detecting section 104 executes document orientation detection, using the image data stored in the page memory 109, thereby determining whether or not a rotation process should be executed thereon.

The page memory control section 108 reads image data from the page memory 109, while executing or not executing the rotation process on the image data in accordance with the detection result of the document orientation detecting section 104. This section then compresses the read image data, and accumulates the compressed image data in the HDD 106 via the system bus 111.

The above-described process is a process of reading one document. When copying a plurality of documents, the process is repeated until no document is left.

The image data accumulated in the HDD 106 is read at a predetermined timing and supplied to the page memory control section 108 via the system bus 111.

After that, the image data is expanded by an expanding section (not shown) and developed in a predetermined area of the page memory 109. In the case of (N-in-1) printing for copying a plurality of documents onto a single paper sheet, the next document is read from the HDD 106, subjected to the above-described process, and developed in a predetermined area of the page memory 109.

After developing image data to be printed onto a single paper sheet, the control section 102 outputs an instruction to execute printing to the printer section 107 via the system bus 111.

The printer section 107 starts a printing operation, such as feeding of a paper sheet, and supplies, via a printer interface 113, the page memory control section 108 with a synchronous signal for reading, at a predetermined timing, image data stored in the page memory 109.

The page memory control section 108 reads image data from the page memory 109 in synchronism with the synchronous signal, and outputs it to the printer section 107 via the printer interface 113. When reading image data, the page memory control section 108 executes rotation/non-rotation reading in accordance with an instruction, from the control section 102, to execute rotation/non-rotation printing.

Specifically, in the rotation reading, the page memory control section 108 subjects image data to a rotation process and outputs the resultant data to the printer section 107. The printer section 107 forms an image on a paper sheet by an electrostatic recording method.

Figure 5:
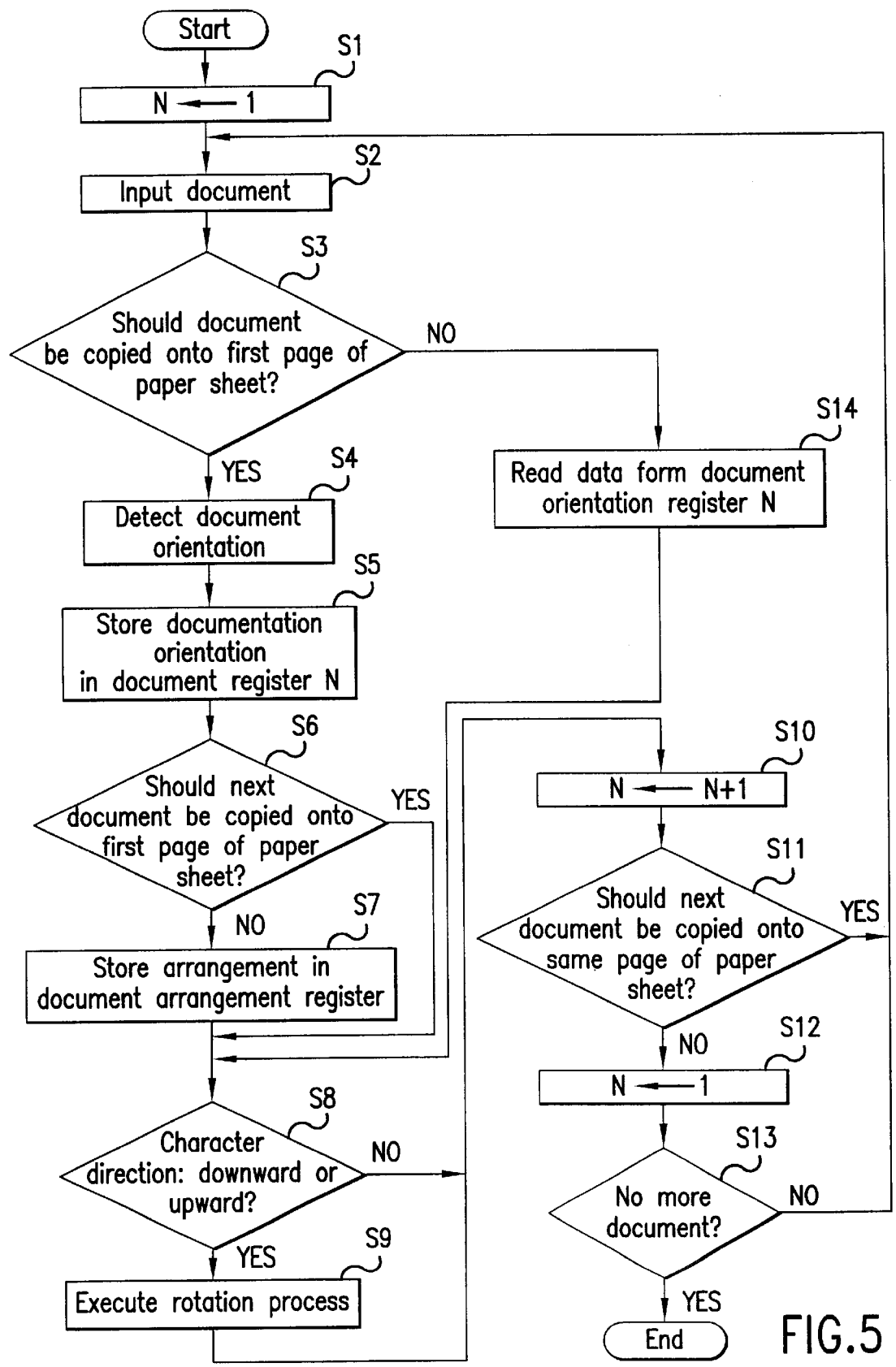
FIG. 5 is a flowchart useful in explaining in detail the flow of a document input process executed by the image forming apparatus of the embodiment.

Referring to the flowchart of FIG. 5, a detailed description will be given of the flow of a document input process executed in the image forming apparatus of the embodiment.

On the basis of an instruction to execute copying, output from the control panel 101, the control section 102 starts a document input process by initializing a variable N (N=1) (step S1).

The variable N indicates the n-th document to be read, which is included in documents to be copied onto a single paper sheet. In the case of, for example, 2-in-1 (two documents are to be copied onto a single paper sheet), the variable N indicates 1 or 2.

After the initialization, the control section 102 supplies the scanner section 110 with an instruction to read image data. The scanner section 110 reads the image data as described above, thereby developing the read image data in the page memory 109 (step S2).

The control section 102 determines whether or not the read image data indicates an image to be printed onto the first page of a paper sheet (step S3).

In the standard copying in which a copying result identical to a document is obtained, only the first page of the document is determined to be an image that is to be printed onto the first page of a paper sheet. In the case of N-in-1, it is determined that images ranging from the leading page to the N-th page should be printed onto the first page of a paper sheet.

If an image is determined to be printed onto the first page of a paper sheet, the document orientation detecting section 104 executes document orientation detection (step S4).

In the document orientation detection process, a character recognition technique is used to thereby extract a character image from image data as a bit map developed in the page memory 109, thereby recognizing a character (characters) from the character image and determining the orientation (upward/downward/leftward/rightward) of the document.

Further, determination as to vertical/horizontal writing is executed from the spaces employed in the character image.

Since the document orientation detecting method is neither a subject matter of the present invention, nor limited to the above, no further description will be given thereof. The determination as to vertical/horizontal writing may be executed by the user beforehand, using the control panel 101.

The document orientation detection result is stored in a document orientation register N (step S5).

As detection results, the orientation (upward/downward/leftward/rightward) of a document and the writing type (vertical/horizontal writing) of the document are stored. The document orientation register N includes registers corresponding to a maximum number of documents to be copied onto a single paper sheet. For example, in the maximum case of 4-in-1 (four documents are copied onto a single paper sheet), N ranges from 1 to 4, and four document orientation registers are included.

A document arrangement register is a register for storing an arrangement of a plurality of documents assumed when the documents are copied onto a single paper sheet. The arrangement is determined on the basis of document orientation detecting results of documents to be copied onto a single paper sheet (steps S6 and S7).

In the case of, for example, 2-in-1, an arrangement area is determined on the basis of changed-orientation detecting results executed after the first two documents are read, and is stored in the arrangement register. The document arrangement register has the same number of registers as the document orientation register.

Document arrangement determination will be described later in detail.

Subsequently, a document orientation detecting result (upward/downward/leftward/rightward) is extracted from the document orientation register N, thereby determining whether or not a rotation process should be executed (step S8).

If the document orientation detecting result indicates "downward" or "leftward", 180°-rotation reading is executed (step S9). If the result indicates "upward" or "rightward", non-rotation reading is executed, and the read image is compressed and accumulated in the HDD 106.

If a document is not one that is to be copied onto the first page of a paper sheet, no document orientation detection is executed, thereby determining, from a document orientation register value based on the variable N, whether the rotation process or a non-rotation process should be executed.

Thereafter, the variable N is incremented (step S10).

If the next document is one that is to be copied onto the same paper sheet, the process beginning from document reading is repeated (step S11). If, on the other hand, the next document is one that is to be copied onto another paper sheet, the variable N is initialized (N=1) (steps S11 and S12).

If no more documents are left, document input is terminated, whereas if another document is left, the process beginning from document reading is repeated (step S13).

Figure 6:
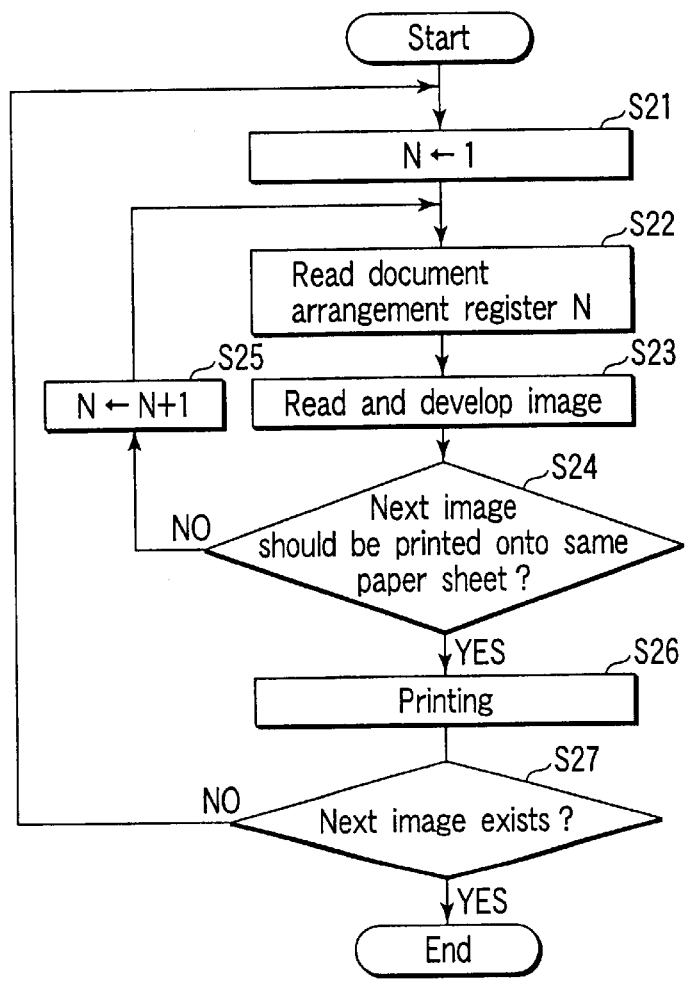
FIG. 6 is a flowchart useful in explaining in detail the flow of a printing process executed by the image forming apparatus of the embodiment.

Referring to the flowchart of FIG. 6, the flow of a printing process executed by the image forming apparatus of the embodiment will be described in detail. The printing process is started when image data to be printed is accumulated in the HDD 106.

In the standard copying in which the same output as a document is obtained, the printing process is started after data accumulation of a first page document is finished. In the case of N-in-1 (N pages are printed onto a single paper sheet), printing is started after N pages are accumulated.

First, a variable N is initialized (N=1). The variable N has the same function as the variable N used in the document input flow, but is independent of it (step S21).

Subsequently, the arrangement result of the document arrangement register based on the variable N is read (step S22). Then, image data is read from the HDD 106 and expanded. Further, the image data is developed in the area of the page memory 109, which is indicated by the document arrangement register (step S23).

Thereafter, it is determined whether or not the next image should be printed onto the same page of a paper sheet (step S24). If it should be printed onto the same page, the variable N is incremented, thereby repeating the process beginning from document arrangement result reading based on the variable N. If the next image should not be printed onto the same page, an instruction to execute printing is supplied to the printer section 27, thereby printing image data stored in the page memory 109 onto the paper sheet (step S26).

After printing, it is determined whether or not another image exists. If it exists, the process beginning from the initialization of the variable N is repeated, whereas if no image exists, the printing process is finished (step S27).

Referring to FIGS. 7 and 8, the document arrangement determining method used in the case of N-in-1 will be described in detail. FIGS. 7 and 8 show a document arrangement example for so-called 2-in-1 printing, in which images of the both sides of a document are printed onto one side of a paper sheet.

More specifically, FIG. 7 shows a case where the main scanning direction of a document corresponds to the length thereof, while FIG. 8 shows a case where the main scanning direction of a document corresponds to the width thereof.

"Top side character orientation" indicates a document orientation (upward/downward/leftward/rightward) as the document orientation detecting result of the top side of a document. "Top side horizontal/vertical writing" indicates horizontal/vertical writing as the document orientation detecting result of the top side of a document. "Reverse side character orientation" indicates a document orientation (upward/downward/leftward/rightward) as the document orientation detecting result of the reverse side of a document.

It is not possible that the reverse side of a document whose top side is determined to be "upward" or "downward" is determined to be "leftward" or "rightward". Accordingly, the reverse side of a document whose top side is determined to be "upward" or "downward" is determined to be "upward" or "downward". Similarly, it is not possible that the reverse side of a document whose top side is determined to be "leftward" or "rightward" is determined to be "upward" or "downward". Accordingly, the reverse side of a document whose top side is determined to be "leftward" or "rightward" is determined to be "leftward" or "rightward".

"Top side rotation process/reverse side rotation process" indicates whether or not the rotation process shown in FIG.

5 has been executed. Specifically, "0" indicates accumulation of data in the HDD 106 without executing the rotation process, and "180" indicates accumulation of data in the HDD 106 after rotating the data through 180°.

As a result of the rotation process, all images are directed upward or rightward and then accumulated in the HDD 106.

"Top side 2-in-1 arrangement/reverse side 2-in-1 arrangement" expresses an arrangement of images in the page memory 109. In FIG. 7, if the respective top sides of documents are determined to be "upward" or "downward", they are all directed upward by the rotation process.

Figure 9A:
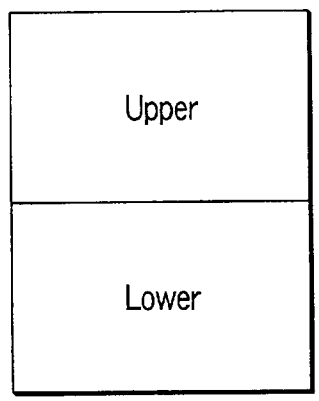
FIG. 9A is a view illustrating a data arrangement (upper/lower arrangement) on a page memory 109.

Accordingly, irrespective of vertical/horizontal writing, the top and reverse sides of each document are arranged in upper and lower portions of the page memory 109, respectively, as shown in FIG. 9A.

Further, in FIG. 7, documents having their top sides determined to be "rightward" or "leftward" are all directed rightward by the rotation process. Accordingly, as shown in FIG. 9A, documents with vertical writing are arranged such that their top sides and reverse sides are arranged in lower and upper portions of the page memory 109, respectively. Further, documents with horizontal writing are arranged such that their top sides and reverse sides are arranged in upper and lower portions of the page memory 109, respectively.

Figure 9B:
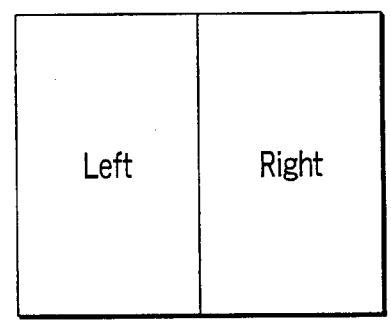
FIG. 9B is a view illustrating a data arrangement (left/right arrangement) on the page memory 109.

Similarly, in FIG. 8, documents having their respective top sides determined to be "upward" or "downward" are all directed upward by the rotation process. Accordingly, as shown in FIG. 9B, documents with vertical writing are arranged such that their top sides and reverse sides are arranged in right and left portions of the page memory 109, respectively. Further, documents with horizontal writing are arranged such that their top sides and reverse sides are arranged in left and right portions of the page memory 109, respectively.

Further, in FIG. 8, documents having their top sides determined to be "rightward" or "leftward" are all directed rightward by the rotation process. Accordingly, irrespective of vertical/horizontal writing, the top and reverse sides of each document are arranged in right and left portions of the page memory 109, respectively, as shown in FIG. 9B.

Figure 10:
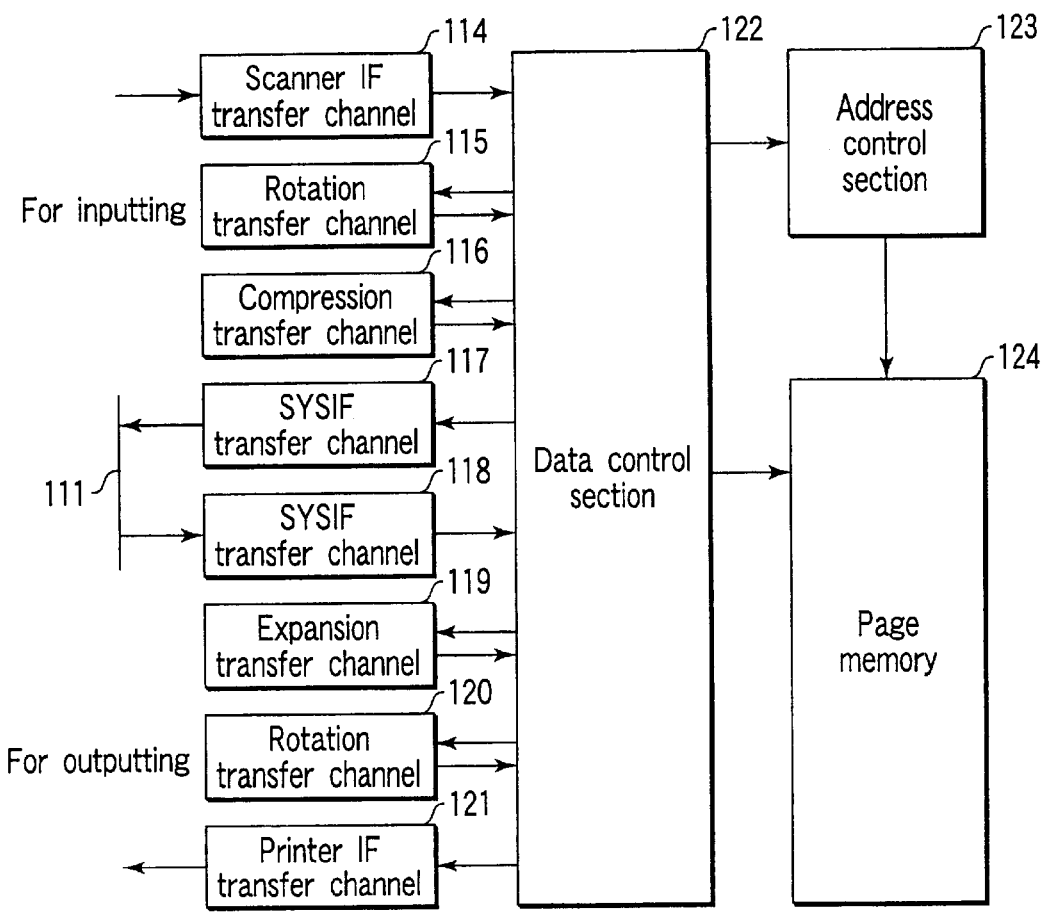
FIG. 10 is a view illustrating, in more detail, the configuration and function of a page memory control section 28 appearing in FIG. 4.

Referring then to FIG. 10, a more detailed description will be given of the configuration and function of the page memory control section 28 shown in FIG. 4.

As shown in FIG. 10, the page memory control section 108 comprises a scanner IF transfer channel 114, a rotation transfer channel 115 for inputting, a compression transfer channel 116, SYSIF transfer channels 117 and 118, an expansion transfer channel 119, a rotation transfer channel 120 for outputting, a printer IF transfer channel 121, a data control section 122, an address generating section 123 and a page memory 124.

The scanner IF transfer channel 114, printer IF transfer channel 121 and SYSIF transfer channels 117 and 118 interface the page memory 124 with another process block to enable data transfer therebetween. The compression transfer channel 116, the rotation transfer channel 115 for inputting, expansion transfer channel 119 and rotation transfer channel 120 for outputting provide respective interface functions that include respective data processing functions. The data control section 122 adjusts data transfer requests from the transfer channels, thereby executing data transfer between the page memory 124 and the transfer channel that is allowed to execute data transfer.

The address control section 123 generates an address for the page memory 124.

The scanner IF transfer channel 114 receives image data, output from the scanner section 110 (in units of, for example, 8 pixels), in synchronism with a synchronous signal also output from the scanner section 110. The scanner IF transfer channel 114 outputs a transfer request to the data control section 122 when it has received image data of 32 pixels, which is a unit for data transfer between itself and the page memory 124.

Thus, image data is output to the data control section 122 in synchronism with a data-transfer-allowing signal output from the data control section 122.

The data control section 122 adjusts transfer requests from the transfer channels, and determines a transfer allowable channel on the basis of the order of priority, such as a round robin.

When executing writing from a transfer channel to the page memory 124, at first, the data control section 122 outputs a transfer-allowing signal to a transfer-allowed transfer channel, and receives image data output form the transfer channel in synchronism with the signal. At the same time, the data control section 122 outputs the number of the allowed transfer channel to the address generating section 123.

The address generating section 123 has an address generating function for each transfer channel, and supplies, at a predetermined timing, the page memory 124 with an address assigned to the transfer channel based on the number output from the data control section 122. At the same time, the data control section 122 outputs data to the page memory 124.

Referring then to FIGS. 11A–11D, the order of access to the page memory 124 in the image forming apparatus of the embodiment will be described.

Figure 11A:
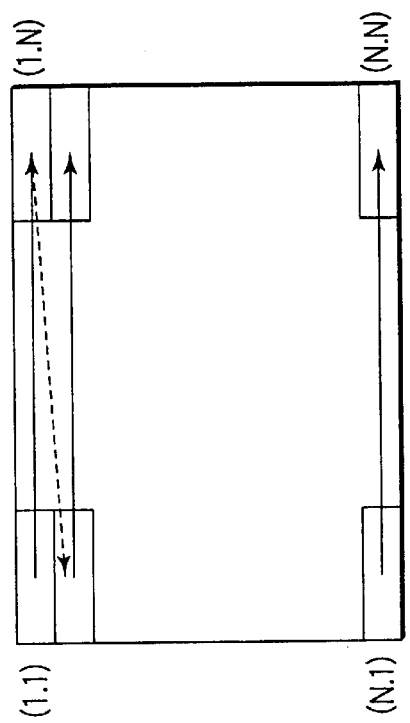
FIG. 11A is a view illustrating an order of access (at the time of a non-rotation process) to a page memory 124 incorporated in the image forming apparatus according to the embodiment.

First, FIG. 11A shows the order of access to the page memory 124, assumed when executing a non-rotation process. In this case, the order of access to the page memory 124 is from left to right and from top to bottom. Further, image data input to the data control section via the scanner IF transfer channel 114 is written into the page memory 124 in this order.

Figure 11B:
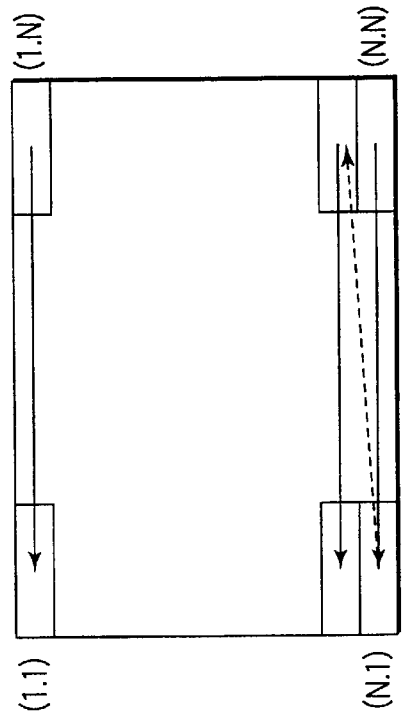
FIG. 11BA is a view illustrating another order of access (at the time of a 180-degree-rotation process) to the page memory 124 incorporated in the image forming apparatus according to the embodiment.

FIG. 11B shows the order of access to the page memory 124, assumed when executing a 180° rotation process. In this case, the order of access to the page memory 124 is from right to left and from bottom to top. When writing, into the page memory 124, image data read by the scanner section 110 and rotated through 180°, the rotation transfer channel 115 for inputting is not used. The address control section 123 generates an address when compressing image data, so that the compression transfer channel 116 will perform a 180° rotation process.

In other words, if the compression transfer channel 116 can input image data, it outputs a request to the data control section 122 to obtain image data from the page memory 124. The data control section 122 compresses it.

If the compressed data can be output (i.e., if compression data consists of a unit (32 bits), by which the data can be written into the page memory 124), a request to write data into the page memory 124 is output to the data control section 122.

The SYSIF transfer channel 117 interfaces the HDD 106 with the page memory 124 to enable data transfer therebetween. Specifically, if the SYSIF transfer channel 117 can input data, it outputs a transfer request to receive compressed data from the page memory 124. Further, if the compressed data can be output, the channel 117 outputs the compressed data to the HDD 106 via the system bus 111 in accordance with a transfer request from a HDD control section (not shown). Also, if the SYSIF transfer channel 118 can input data, it receives data from the HDD 106 in accordance with a request from the HDD control section, not shown. In other words, if the transfer channel contains data input by the above-described process, it outputs a transfer request to a data transfer control section (not shown), thereby writing the data into the page memory 124.

The expansion transfer channel 119 outputs a request to the data control section 122 if it can receive data, thereby reading, from the page memory 124, compressed data input from the HDD 106 to the page memory 124 by the SYSIF transfer channel 118, and expanding the read data by a predetermined algorithm. If the expanded data can be output, the channel 119 outputs a request to the data control section 122, thereby writing the expanded data into the page memory 124.

If there is an instruction to execute 90°/270° rotation, the rotation transfer channel 120 for outputting rotates the expanded data and writes it into the page memory 124.

In the expansion transfer channel 119, the order to access to the page memory 124 is the same as that assumed in the non-rotation process shown in FIG. 11A.

Figure 11C:
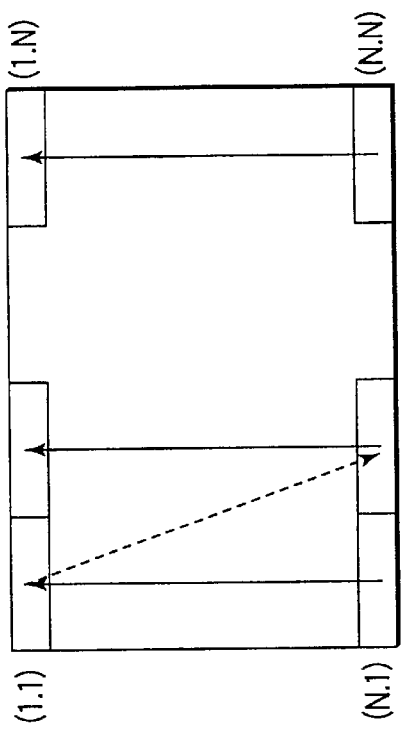
FIG. 11C is a view illustrating a further order of access (at the time of a 90-degree-rotation process) to the page memory 124 incorporated in the image forming apparatus according to the embodiment.

In the case of a 90° rotation process, the rotation transfer channel 120 for outputting assumes the order of access shown in FIG. 11C. Specifically, data is read from the page memory 124 in the order of from bottom to top and from left to right. Since the unit of access to the page memory 124 is 32 bits, the rotation process section 120 executes length/width conversion and writes the resultant data into the page memory 124, when data of (32 bits×32 lines) has been input thereto.

Figure 11D:
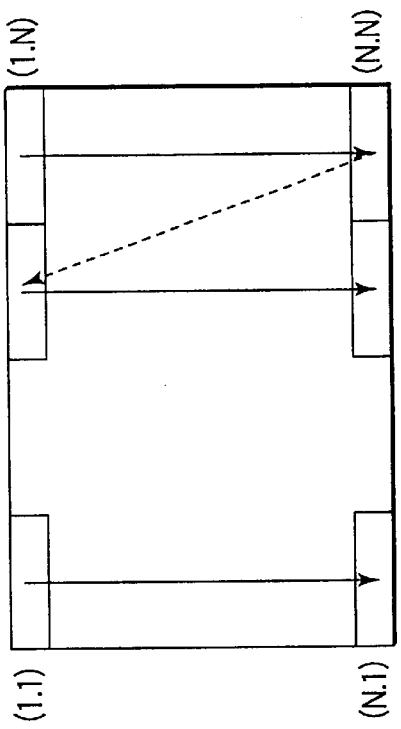
FIG. 11D is a view illustrating yet another order of access (at the time of a 279-degree-rotation process) to the page memory 124 incorporated in the image forming apparatus according to the embodiment.

When there is an instruction to execute 270° rotation, the order of access shown in FIG. 11D is employed. In other words, data is read from the page memory 124 in the order of from top to bottom and from right to left, thereby performing length/width conversion of 32×32, and writing the resultant data into the page memory 124.

The printer IF transfer channel 121 reads image data from the page memory 124 if there is an instruction to execute rotation printing. If there is no instruction to execute rotation printing, it reads, from the page memory 124, image data obtained after the expansion process. After that, the channel outputs image data to the printer section 107 in synchronism with a synchronous signal output from the printer section 107.

As described above, the image forming apparatus and method of the present invention enable a complicated process to be automatically executed by executing a character recognition process, which requires a lot of time, only on a document to be copied onto a first paper sheet. In this case, the copying performance is degraded only in that almost the same time as required when the user manually performs setting without using the character recognition process is required.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming apparatus for reading images of documents that are defined by a main scanning direction and a sub-scanning direction, and copying the images onto an image forming medium, comprising:

conveyance means for conveying a document;

reading means for reading an image of the document to obtain image data;

determining means for determining whether or not the conveyed document is copied first, and also determining, on the basis of the determination result, whether or not an orientation of the document should be detected;

document orientation detecting means for extracting character data from the image data, recognizing the character data, and detecting the orientation of the document on the basis of the recognition result, if the determining means determines that the orientation of the document should be detected;

image data rotation process means for executing a rotation process on the image data obtained by the reading means, on the basis of the detection result of the document orientation detecting means; and image forming means for reading the image data subjected to the rotation process by the image data rotation process means, thereby forming an image onto the image forming medium.

2. The image forming apparatus according to claim 1, wherein the determining means determines whether or not the document is to be copied onto a first page of the image forming medium, and determining that the document orientation detecting means should detect the orientation of the document, only if the determining means determines that the document is to be copied onto the first page of the image forming medium.

3. The image forming apparatus according to claim 1, wherein the document orientation detecting means detects the orientation of the document and whether the document employs vertical writing or horizontal writing.

4. The image forming apparatus according to claim 1, wherein the image data rotation process means executes a rotation process so as to direct, upward, images of all documents, irrespective of vertical writing or horizontal writing, if the document orientation detecting means determines that images of top sides of the documents are directed upward or downward.

5. The image forming apparatus according to claim 1, wherein the image data rotation process means executes a rotation process so as to direct, rightward, images of all documents, irrespective of vertical writing or horizontal writing, if the document orientation detecting means determines that images of top sides of the documents are directed rightward or leftward.

6. An image forming apparatus for reading images of documents that are defined by a main scanning direction and a sub-scanning direction, and copying the images onto image forming medium, comprising:

a conveyance section configured to convey a document;

a scanner section configured to read an image of the document and obtain image data;

a control section configured to determine whether or not the conveyed document should be copied onto a first page of the image forming medium, and to determine that an orientation of the document should be detected by a document orientation detecting section, only if the document is determined to be copied onto the first page of the image forming medium;

a document orientation detecting section configured to extract character data from the image data, recognize the character data, and detect the orientation of the document on the basis of the recognition result, if the determining section determines that the orientation of the document should be detected;

a page memory control section configured to execute a rotation process on the image data obtained by the scanner section, on the basis of the detection result of the document orientation detecting section; and a printer section configured to read the image data subjected to the rotation process, thereby forming an image onto the image forming medium.

7. The image forming apparatus according to claim 6, wherein the page memory control section executes a rotation process so as to direct, upward, images of all documents, irrespective of vertical writing or horizontal writing, if the document orientation detecting section determines that images of top sides of the documents are directed upward or downward.

8. The image forming apparatus according to claim 6, wherein the page memory control section executes a rotation process so as to direct, rightward, images of all documents, irrespective of vertical writing or horizontal writing, if the document orientation detecting section determines that images of top sides of the documents are directed rightward or leftward.

9. An image forming method of reading images of documents that are defined by a main scanning direction and a sub-scanning direction, and copying the images onto an image forming medium, comprising:

a first step of conveying a document;

a second step of reading an image of the document to obtain image data;

a third step of determining whether or not the conveyed document is copied first, and also determining, on the basis of the determination result, whether or not an orientation of the document should be detected;

a fourth step of extracting character data from the image data, recognizing the character data, and detecting the orientation of the document on the basis of the recognition result, if it is determined that the orientation of the document should be detected;

a fifth step of executing a rotation process on the image data obtained by the reading means, on the basis of the detection result; and a sixth step of reading the image data subjected to the rotation process, thereby forming an image onto the image forming medium.

10. The image forming method according to claim 9, wherein it is determined in the third step whether or not the document is to be copied onto a first page of the image forming medium, and it is determined in the fourth step that the orientation of the document should be detected, only if it is determined that the document is to be copied onto the first page of the image forming medium.

11. The image forming method according to claim 9, wherein in the fourth step, the orientation of the document is detected, and also, whether the document employs vertical writing or horizontal writing is detected.

12. The image forming method according to claim 9, wherein in the fifth step, a rotation process is executed on image data so as to direct, upward, images of all documents, irrespective of vertical writing or horizontal writing, if it is determined in the fourth step that images of top sides of the documents are directed upward or downward.

13. The image forming method according to claim 9, wherein in the fifth step, a rotation process is executed on image data so as to direct, rightward, images of all documents, irrespective of vertical writing or horizontal writing, if it is determined in the fourth step that images of top sides of the documents are directed rightward or leftward.

14. An image forming method of reading images of documents that are defined by a main scanning direction and a sub-scanning direction, and copying the images onto image forming medium, comprising:

a first step of conveying a document using a conveyance section;

a second step of reading an image of the document and obtaining image data, using a scanner section;

a third step of determining, using a control section, whether or not the conveyed document should be copied onto a first page of the image forming medium, and determining that an orientation of the document should be detected by a document orientation detecting section, only if the document is determined to be copied onto the first page of the image forming medium;

a fourth step of extracting character data from the image data, recognizing the character data, and detecting the orientation of the document on the basis of the recognition result, using the document orientation detecting section, if the determining section determines that the orientation of the document should be detected;

a fifth step of executing, using a page memory control section, a rotation process on the image data obtained by the scanner section, on the basis of the detection result of the document orientation detecting section; and a sixth step of reading the image data subjected to the rotation process, and forming an image onto the image forming medium, using a printer section.

15. The image forming method according to claim 14, wherein the page memory control section executes, in the fifth step, a rotation process on image data so as to direct, upward, images of all documents, irrespective of vertical writing or horizontal writing, if the document orientation detecting section determines, in the fourth step, that images of top sides of the documents are directed upward or downward.

16. The image forming method according to claim 14, wherein the page memory control section executes, in the fifth step, a rotation process on image data so as to direct, rightward, images of all documents, irrespective of vertical writing or horizontal writing, if the document orientation detecting section determines, in the fourth step, that images of top sides of the documents are directed rightward or leftward.

* * * * *